United States Patent [19]

Choi

[11] Patent Number: 5,068,758

[45] Date of Patent: Nov. 26, 1991

[54] CASSETTE LOADING DEVICE FOR A TAPE RECORDER

[75] Inventor: Kwang-Moon Choi, Suweon, Rep. of Korea

[73] Assignee: SamSung Electronics Co., Ltd., Kyung-Ki, Rep. of Korea

[21] Appl. No.: 456,858

[22] Filed: Dec. 27, 1989

[30] Foreign Application Priority Data

May 23, 1989 [KR] Rep. of Korea ............... 89-6757[U]

[51] Int. Cl.⁵ .............................................. G11B 15/66
[52] U.S. Cl. .................................. 360/96.6; 360/96.5; 360/95
[58] Field of Search .................. 360/93, 96.5, 96.6, 360/85, 95; 242/198

[56] References Cited

U.S. PATENT DOCUMENTS

| | | | |
|---|---|---|---|
| 3,870,247 | 3/1975 | Carisey | 360/96.6 |
| 3,950,787 | 4/1976 | Hosaka | 360/96.6 |
| 4,050,087 | 9/1977 | Kishi | 360/96.6 |
| 4,072,988 | 2/1978 | Sato et al. | 360/96.6 |
| 4,301,484 | 11/1981 | Sawaguchi et al. | 360/96.6 |
| 4,747,000 | 5/1988 | Godsoe | 360/96.6 |

FOREIGN PATENT DOCUMENTS

| | | | |
|---|---|---|---|
| 57-135469 | 8/1982 | Japan | 360/96.6 |
| 61-170951 | 8/1986 | Japan | 360/96.6 |
| 62-46460 | 2/1987 | Japan | 360/96.6 |
| 63-181158 | 7/1988 | Japan | 360/96.6 |

*Primary Examiner*—A. J. Heinz
*Assistant Examiner*—Alfonso Garcia
*Attorney, Agent, or Firm*—Bushnell, Robert E.

[57] ABSTRACT

A cassette loading device for use in the tape recorder of which a door and a receiving holder is opened and closed by levers against a deck, wherein a slider of a cassette interposed between the receiving holder and the door is slidingly opened and closed by an opening and closing function of the door thereby enabling the height of the door and the receiving holder to be changeably positioned mutually with in opening and closing of the door and the receiving holder. The middle portion of the door is connected with the lower part of the deck by a third pair of lever members supported by a pair of pins; the door is connected with each lever member of the third pair of lever members supported by a pair of hinge members mounted on the lower ends of the receiving means. The pins are connected with the pair of hinge members so as to fit in the guide grooves while member for opening in the lid of the cassette is a horizontal supporting member mounted in the deck to facilitate safe loading of the lower end of a cassette. This device enables the cassette to be easily and conveniently loaded.

22 Claims, 2 Drawing Sheets

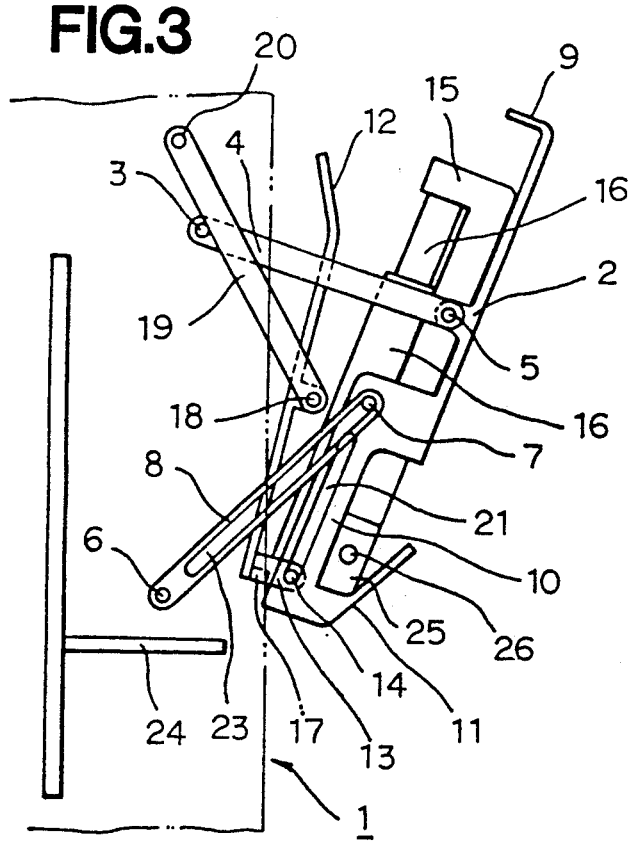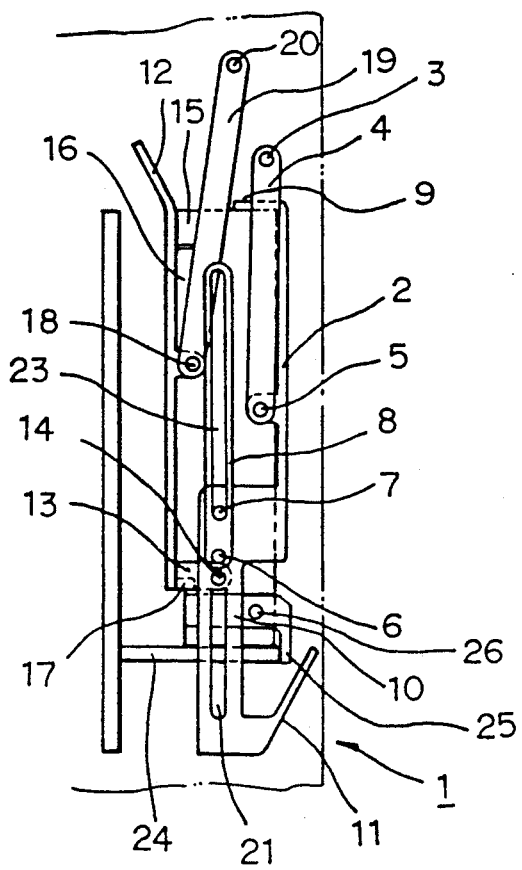

CASSETTE LOADING DEVICE FOR A TAPE RECORDER

BACKGROUND OF THE INVENTION

This invention relates to a cassette housing for use in a digital audio taperecorder (DAT), and particularly a cassette housing with a vertical door for use in a DAT to expose reel hubs by operating a slider formed in a cassette when the cassette is inserted into a deck.

Generally, as shown in FIG. 2, in the cassette used in the DAT, unlike audio cassettes or video cassettes, both the reel hubs which have a function for winding the tape are not normally exposed to the outside and are shut by a slider formed in the rear side of the cassette. When the cassette is inserted into the door of the cassette housing and is loaded in the deck, the slider of the cassette is opened to expose the reel hubs of the cassette.

However, since the conventional cassette housing for use in the DAT has no function for kinematically opening the slider of the cassette, a user must carefully insert the cassette into the cassette housing formed intergrally with the door. Otherwise, the slider of the cassette won't be opened and the door won't be shut, either. Accordingly, there are some problems that, conventionally, make the handling of a cassette difficult for old persons, children, or drivers during their driving, to use the cassette housing.

SUMMARY OF THE INVENTION

It is an object of the present invention to provide a cassette housing for use in a DAT which makes the loading of a cassette easier. This object is achieved in the present invention by the provision of a configuration wherein a slider is opened to expose reel hubs of the cassette, when the cassette is loaded in a deck.

To achieve the above mentioned object, a cassette housing for use in a digital audio taperecorder, in which the middle portion of a door is respectively connected with each of two pairs of lever members supported by each of two pairs of pins on both the upper and lower portion of a deck, includes a door having an inward jaw and an outward jaw formed at the upper end and the lower end of said door, respectively, and a pair of guide grooves formed in a longitudinal direction of a pair of sidewalls, wherein the door is connected with each of the pair of lever members supported on the deck by each of the pair of pins formed in the upper end of each of the guide grooves; a receiver connected with the deck via a pair of levers for receiving a cassette, the receiver being positioned at the inside of said door and having a pair of pins connected with a pair of hinge members at both the lower ends of said receiving means to be fitted with said guide grooves; a pair of operating means being formed respectively at both of the lower ends of the receiver for operating a slider of the cassette; a horizontally supporting member formed in the deck for opening a lid mounted on the lower end of the cassette and for saftely loading the lower end of the cassette.

BRIEF DESCRIPTION OF THE DRAWINGS

These and other objects, features, and advantages of the present invention will become more apparent from the following description for the preferred embodiments taken in conjunction with the accompanying drawings, in which:

FIG. 3 is a side view illustrating the opened state of a door of the cassette housing according to the present invention.

FIG. 4 is a side view illustrating a loaded state of the cassette in the cassette housing according to the present invention.

DESCRIPTION OF THE DRAWINGS

The present invention will be now described in more detail with the accompanying drawings.

Figure 1:
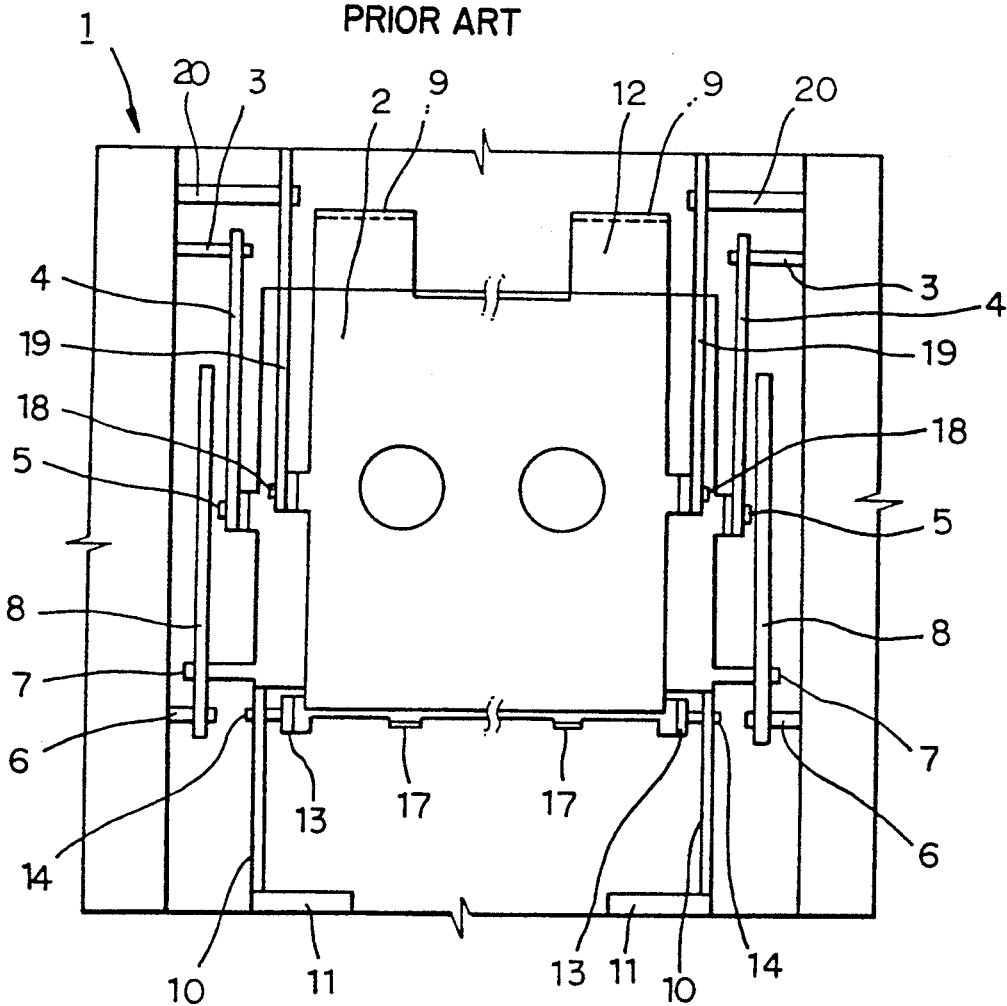
FIG. 1 is a schematic front view of a cassette housing according to the present invention.
Figure 2A:
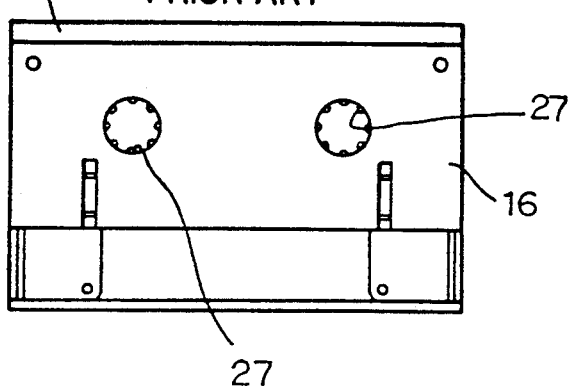
FIG. 2(A) and FIG. 2(B) are a front view illustrating an opened state of a slider formed in a cassette and a side view illustrating a closed state of the slider, respectively.
Figure 2B:
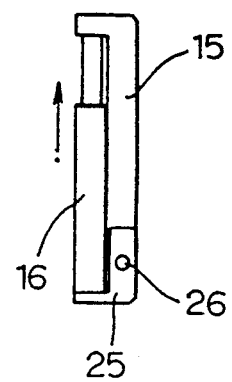

FIG. 1 is a schematic front view of a cassette housing for use in a DAT of an embodiment according to the present invention. Both the middle parts of a door 2 provided in a deck 1 are connected via each pin of a pair of pins 5 to each lever of a pair of levers 4 which is fitted with each pin of a pair of fixed pins 3 formed on the upper portion of the deck 1. Each pin of a pair of fixed pins 6 formed on the lower portion of the deck 1 is connected via each lever of a pair of levers 8 with each pin of a pair of pins 7 formed on the lower portion of the door 2.

Further, an upper inward jaw 9 is formed at the upper end of the door 2 and also a lower outer jaw 11 is formed at the lower end of a pair of sidewalls 10 which are formed extending from the lower end of the door 2. A pair of hinge members 13 are provided at both the lower end of a cassette receiving means (a cassette holder) 12 which is positioned at the inside of the door 2. Each pin of a pair of pins 14 formed at the outside of each of said hinge members 13 is inserted into each of the sidewalls 10. A pair of slider operating members 17 are formed at the inner portions to operate a slider 16 provided on the rear side of a cassette 15. Each lever of a pair of levers 19, which is connected with each pin of a pair of pins 18 formed on the middle portion of the cassette holder 12, is fitted with each pin of a pair of fixed pins 20.

On the other hand, each of a pair of guide grooves 21 is formed within each of the sidewalls 10 of the door 2 as shown in FIG. 3 and FIG. 4 to insert the pin 14 formed at the hinge member 13 into the groove 21. A long slot 23 is formed in the lever 8 which is fitted with the fixed pin 6 to be rotated. Also, the pin 7 which is formed on the upper portion of the sidewall 10, is inserted into the long slot 23 to move door 2 up and down.

Further, a horizontally supporting member 24 is provided at the lower portion of the deck 1. When the cassette 15 is loaded, the horizontally supporting member 24 may open a lid (i.e., a flap, or cover) 25 mounted on the lower end of the cassette 15 by rotating the lid 25 around a pair of pins 26, and simultaneously may load the lower end of the cassette 15. Numeral 27 designates a pair of reel hubs and a detailed explanation is omitted here.

The operation and effect of the present invention with the above configuration will now be explained in detail.

As shown in FIG. 3, when an operating button (not shown) is pushed to open the door 2 and the cassette 15 is intended to be inserted into the door 2, the door 2 is opened in a upwardly inclined direction since each of the links 4 and 8 is rotated around each of the fixed pins 3 and 6. The pin 7 provided at the sidewall 10 of the door 2 is positioned at the upper end part of the long slot 23 which is formed in the lever 8. Further, the cassette holder 12 positioned at the inside of the door 2 is rotated in accordance with the rotation of the lever 19. The pin 14 of the hinge member 14 is positioned at the lower end part of the guide groove 21 which is formed within the sidewall 10 of the door 2.

At this point, when the cassette 15 is inserted into the inside of the door 2, the lower end of the cassette 15 is supported by the lower outward jaw 11 and the slider 16 is slightly put on the slider operating members 17 which are formed at both the lower ends of the cassette holder 12.

Now, when the door 2 is shut, the door 2 is moved to approach toward the deck 1 while the lever 4 is rotated around the pin 3 in a clockwise direction in FIG. 3. Simultaneously, the pin 7 formed in the sidewall 10 moves down along the long slot 23 of the lever 8.

Further, while the lever 19 fitted with fixed pins 20 is rotated along the fixing pin 20 in the clockwise direction, the cassette holder 12 which is connected with the lever 19 via the pin is moved toward the inside of the deck 1. At this time, the rotation speed of the lever 19 is slower than that of the door 2. The door 2 is continuously moved down while the pin 14 of the hinge member 13 moves up along the guide groove 21 formed within the sidewall 10.

Sequentially, when the upper inward jaw 9 contacts the top of the cassette 15 and the slider operating member 17 formed at the lower end of the cassette holder 12 hangs on to the lower portion of the slider 16, the slider operating member 17 moves the slider 16 upwardly. When the door 2 is completely shut as shown in FIG. 4, the slider 16 of the cassette 15 is completely opened to expose the reel hubs 27 to the outside.

Further, when the cassette 15 is loaded into the deck 1, the lid 25 of the lower end part of the cassette 15 is rotated along the pin 26 by the vertically supporting member 24 and the lid 25 is completely opened to operate the tape. The loading of the cassette 15 is completed according as the bottom of the cassette 15 is put on the vertically supporting member 24.

As mentioned above, when the cassette is loaded into the deck, the slider is opened by the slider operating members to expose the reel hubs of the cassette according to the present invention. Therefore, loading the cassette more easily may be attained and everybody may conveniently use the cassette housing according to the present invention.

The invention is in no way limited to the embodiment described hereinabove. Various modifications of disclosed embodiment as well as other embodiments of the invention will become apparent to persons skilled in the art upon reference to the description of the invention. It is therefore contemplated that the appended claims will cover any such modification or embodiments as fall within the true scope of the invention.

What is claimed is:

1. A cassette loading device, in which a middle portion of a door is respectively connected with each of first and second pairs of lever members supported by each of two pairs of pins on both a first and a second portion of a deck, comprising:
 a door including a pair of sidewalls, an inward jaw and an outward jaw formed at a first end and a second end of the door, respectively, and a pair of guide grooves formed in a longitudinal direction of said pair of sidewalls, wherein said door is connected with each of said first and second pairs of lever members supported on the deck by each of said pairs of pins formed in first ends of each of said guide grooves;
 receiving means connected with the deck via a third pair of levers for receiving a cassette, said receiving means being positioned inside of said door and having a pair of pins connected with a pair of hinge members at both of first ends of said receiving means, said pair of pins to be fitted with said guide grooves;
 a pair of operating elements formed respectively at both of the first ends of said receiving means, for operating a sliding cover of the cassette; and
 horizontal supporting means formed in the deck for opening a lid mounted on a first end of the cassette as said door approaches the deck.

2. A cassette loading device as claimed in claim 1, wherein said receiving means is connected with the deck via said third pair of levers to move up and down relative to the inside of said door.

3. A cassette loading device according to claim 1, wherein the first end of the receiving means is positioned higher than the first end of the door when closing the door toward the deck, at the first end of the door is positioned higher than the first end of the receiving means when opening the door.

4. A cassette loading device according to claim 1, wherein the lid of the cassette is rotatably opened and closed at the same time as the slider of the cassette is slidingly opened and closed, by opening and closing operation of the door and the receiving means relative to the deck.

5. A cassette loading device according to claim 1, wherein the middle portion of the door is connected with the second part of the deck by said second pair of lever members supported by one of said pairs of pins, and the door is connected with each lever member of said first and second pairs of lever members supported by a pair of said closer than said guide grooves to said first end of said door.

6. A cassette loading device according to claim 1, wherein said receiving means further comprises a pair of hinge members and a pair of pins on said pair of hinge members at both of the second ends of the door to be fitted with said guide grooves.

7. A cassette loading device according to claim 2, wherein said receiving means further comprises a pair of hinge members and a pair of pins on said pair of hinge members at both of the second ends of the door to be fitted with said guide grooves.

8. A cassette loading device according to claim 3, wherein the sliding cover is opened and closed by said slide operating members formed on both of the second ends of the receiving means.

9. A cassette loading device according to claim 3, where the lid of the cassette is opened and closed by pivotedly driving the lid against said horizontal supporting member formed in the deck.

10. A cassette loading device, comprising:
 a door;
 receiving means slidably coupled to a distal portion of said door, for receiving a cassette interposed between said door and receiving means while said receiving means is in a first position, for engaging the cassette as said receiving means travels to a second position, and for retaining the cassette between said door and receiving means while said receiving means is in said second position;

a plurality of connecting means connectable to a deck, with a first of said connecting means able to pivotally connect a distal portion of said door to a first location on said deck and a second of said connecting means able to pivotally connect a central portion of the receiving means to a second location on the deck while maintaining a first lateral disposition between a proximal portion of said door and a proximal portion of said receiving means while said receiving means is in said first position and a second and different lateral disposition between said proximal portion of said door and said proximal portion of said receiving means while said receiving means is in said second position;

means disposed between said door and receiving means, for guiding said door as said door is opened and closed; and means interposed between said door and receiving means for engaging a sliding cover and a pivotable lid of a cassette positioned between said door and receiving means, wherein the sliding cover of the cassette interposed between the receiving means and the door is slidingly opened and closed and the lid is pivotably opened and closed, by opening and closing of the door as the first and second displacements of the door and the receiving means are varied during opening and closing of the door.

11. A cassette loading device according to claim 10, further comprised of a distal end of the receiving means being positioned higher than said distal end of the door when closing the door toward the deck, and the distal end of the door is positioned higher than the distal end of the receiving means when opening the door.

12. A cassette loading device according to claim 10, wherein a lid of the cassette is rotatably opened and closed at the same time as the sliding cover of the cassette is slidingly opened and closed, by the opening and closing operation of the door and the receiving means relative to the deck.

13. A cassette loading device according to claim 10, wherein the door includes a pair of sidewalls, an inward jaw and an outward jaw formed at the distal end and the proximal end of said door respectively, a pair of guide grooves formed along a longitudinal direction of a pair of sidewalls to slidingly receive said proximal end of said door, and a pair of pins formed on the door above the upper end of each of a second pair of guide grooves connected with each of a third of said plurality of connecting means connected to the deck.

14. A cassette loading device according to claim 10, wherein said receiving means further comprises a pair of hinge members and a pair of pins on said pair of hinge members at both of the proximal portions of the door to be fitted within corresponding guide grooves of said door.

15. A cassette loading device according to claim 10, wherein said engaging means is further comprised of a slide operating member formed on said proximal portion of the receiving means, wherein the sliding cover is opened and closed by said slide operating member.

16. A cassette loading device according to claim 10, wherein said engaging means is further comprised of a supporting member mounted on the deck, whereby the lid of the cassette is opened and closed by pivotedly driving the lid against said supporting member as said door and receiving means are respectively opened and closed.

17. A cassette loading device, comprising:

means having a distal end, a proximal end and a sidewall disposed between said distal and proximal ends, for holding a cassette having a cover slidingly disposed on one major surface of the cassette and a lid pivotally mounted on one end of the cassette;

means having a first and a second end, for retaining the cassette within said holding means with the cassette disposed between said distal and proximal ends;

first means for slidably connecting said second end of said retaining means with said holding means;

second means for connecting a first portion of said holding means to a first location of a chassis, said first portion being spaced-apart from said distal end;

third means for connecting a second portion of said holding means to a second location of the chassis, said second portion being further from said distal end than said first portion;

fourth means for connecting a central location of said retaining means to a third location of the chassis;

said first, second and third locations being spaced-apart to enable said distal end to travel toward a first distance of separation from said first end as said holding means is drawn away from the chassis, and to enable said distal end to travel toward a second and lesser distance of separation from said first end as said holding means is subjected to a force toward the chassis;

means disposed between said holding means and said retaining means, for sliding the cover relative to a major surface as said distal end is drawn toward said first end; and means positionable adjacent to said sidewall, for pivoting the lid away from said one end as said distal end is drawn toward said first end.

18. The cassette loading device of claim 17, further comprised of:

said first, second and third locations being vertically spaced-apart on said chassis to enable said distal end to travel from said first distance of separation toward said second distance of separation as said force is applied to said holding means along a horizontal path extending approximately perpendicular to an axis extending between said first and second locations.

19. The cassette loading device of claim 17, further comprised of said first, second and third locations being vertically spaced-apart on the chassis to enable insertion of the cassette between said holding means and said retaining means as the cassette travels along an approximately vertical path towards said proximal end, with said vertical path being approximately parallel to an axis extending through said first and second locations.

20. The cassette loading device of claim 17, further comprised of said first and third locations being positioned on the chassis to impart lateral travel to said first means and to impart relative movement between said holding means and retaining means as said distal end travels from said first to said second distance of separation.

21. The cassette loading device of claim 17, further comprised of said first and third locations being positionable on the chassis to impart lateral travel to said first means and to impart relative movement between said holding means as said distal end travels from said first to said second distance of separation, with said sliding means imparting lateral displacement of said cover relative to the major surface.

22. The cassette loading device of claim 17, further comprised of said first and third locations being positionable on the chassis to impart lateral travel to said first means and to impart relative movement between said holding means and retaining means as said distal end travels from said first to said second distance of separation, with said sliding means sequentially imparting lateral displacement of the cassette toward said distal end and imparting lateral displacement of said cover relative to the major surface as said distal end travels from said first to said second distance of separation.

* * * * *

UNITED STATES PATENT AND TRADEMARK OFFICE
CERTIFICATE OF CORRECTION

PATENT NO. :  5,068,758

DATED :  26 November 1991

INVENTOR(S) :  Kwang-Moon CHOI

It is certified that error appears in the above-identified patent and that said Letters Patent is hereby corrected as shown below:

ON THE TITLE PAGE,
IN THE ABSTRACT

Line 8,   delete "in";

Line 17,  insert --the-- after "while", and delete "in".

Column 1,   Line 22,   replace "intergrally" with --integrally--;

Line 24,   replace "won't" (both occurrences) with --will not--, and delete "be" (second occurrence);

Line 27,   replace "during their" with --while--;

Column 2,   Line 19,   delete "the";

Column 3,   Line 53,   insert --the-- after "of";

UNITED STATES PATENT AND TRADEMARK OFFICE
CERTIFICATE OF CORRECTION

PATENT NO. : 5,068,758

DATED : 26 November 1991

INVENTOR(S) : Kwang-Moon CHOI

It is certified that error appears in the above-identified patent and that said Letters Patent is hereby corrected as shown below:

Claim 5, Column 4, Line 42, insert --pins-- after "said" (first occurrence).

Signed and Sealed this

Sixth Day of April, 1993

*Attest:*

STEPHEN G. KUNIN

*Attesting Officer*  Acting Commissioner of Patents and Trademarks